(12) United States Patent
Eigler et al.

(10) Patent No.: US 8,708,692 B2
(45) Date of Patent: Apr. 29, 2014

(54) APPARATUS FOR INJECTION MOLDING

(71) Applicants: Frank Joseph Eigler, Windsor (CA); Craig Vincent Kovacic, Imlay City, MI (US); Jon R. Garvey, Greenville, MI (US)

(72) Inventors: Frank Joseph Eigler, Windsor (CA); Craig Vincent Kovacic, Imlay City, MI (US); Jon R. Garvey, Greenville, MI (US)

(73) Assignee: DME Company LLC, Madison Heights, MI (US)

( * ) Notice: Subject to any disclaimer, the term of this patent is extended or adjusted under 35 U.S.C. 154(b) by 110 days.

(21) Appl. No.: 13/621,312

(22) Filed: Sep. 17, 2012

(65) Prior Publication Data

US 2014/0079840 A1    Mar. 20, 2014

(51) Int. Cl.
*B29C 45/40* (2006.01)

(52) U.S. Cl.
USPC ............................ 425/556; 264/334; 425/589

(58) Field of Classification Search
USPC ................... 425/556, 589, 594, 595
See application file for complete search history.

(56) References Cited

U.S. PATENT DOCUMENTS

| | | | | |
|---|---|---|---|---|
| 2,808,627 | A | * | 10/1957 | Venus ............................ 425/589 |
| 3,572,424 | A | * | 3/1971 | Byrne ........................... 425/556 |
| 3,749,537 | A | * | 7/1973 | Schriever ....................... 425/556 |
| 5,350,289 | A | | 9/1994 | Martin |
| 6,802,704 | B2 | | 10/2004 | Steil et al. |
| 7,674,105 | B2 | | 3/2010 | Masanek, Jr. |
| 7,993,125 | B2 | | 8/2011 | Kloeppel et al. |
| 2006/0269649 | A1 | | 11/2006 | Ciccone |

OTHER PUBLICATIONS

"MUD Quick-Change Systems from D-M-E", catalogue, undated, pp. 12-14.

* cited by examiner

*Primary Examiner* — Tim Heitbrink
(74) *Attorney, Agent, or Firm* — John W. Gregg (57) ABSTRACT

An apparatus for facilitating removal and installation of mold insert members of a mold assembly from and into the clamp unit of an injection molding machine comprising a material distributing sub-assembly from which at least one material distributing nozzle projects, the apparatus comprises a two-part frame comprising an ejector part, an injection part being releasably connectable to the material distributing sub-assembly, and support pins spanning between the ejector part and the injection part when the injection part is separated from the material distributing sub-assembly, and guide elements projecting from the material distributing sub-assembly to engage a mold insert member received in the injection part and effective to align that mold insert member relative to the material distributing sub-assembly. The two-part frame comprises first clearance bores and second clearance bores allowing protrusion into the mold insert member of, respectively, the material distributing nozzles and the guide elements.

20 Claims, 4 Drawing Sheets

APPARATUS FOR INJECTION MOLDING

BACKGROUND OF THE INVENTION

1. Field of the Invention

This invention relates generally to injection molding. In particular, this invention relates to so-called "quick-change" devices facilitating removal and installation of mold sub-assemblies from and into an injection molding machine.

2. Description of Related Art

It is known to provide two-part frame constructions for installation in the clamp unit of an injection molding machine wherein the two-part frame facilitates removal and installation of mold insert members of components of a mold assembly from and into the clamp unit (so-called "quick change" frame constructions). Such two-part frames comprise an ejector part adapted to receive an ejector "side" of a mold sub-assembly comprising members for forcibly separating molded articles from a mold member and an injection part adapted to receive an injection "side" of a mold sub-assembly comprising members for admitting material to cavities formed by mating mold members. The ejector part of the frame is mounted and attached to a movable platen comprising the clamp unit and the injection part of the frame is mounted and attached to a fixed platen comprising the clamp unit. Relative movement of the movable and fixed platens is effective to abut and separate mold members having article forming surfaces establishing the size and shape of articles to be molded. When abutted, the article forming surfaces of such mold members define at least one so-called "mold cavity". The two-part frame construction comprises elements for seating and clamping the "sides" of a mold sub-assembly that are effective to reduce the time required to remove and install the mold sub-assembly from and into the machine clamp unit that would otherwise be required. To remove a mold sub-assembly, the ejection and injection parts of the frame are positioned so that the "sides" of the mold sub-assembly abut one another, the "sides" of the mold sub-assembly are clamped to each other and the two "sides" are removed from the frame as a unit. To install a mold sub-assembly, the two-parts of the frame are positioned to accommodate therebetween two "sides" of the mold sub-assembly clamped abuttingly to one another, the two sides are inserted into the frame as a unit, clamps holding the two "sides" of the mold sub-assembly together are released, the ejection "side" of the mold sub-assembly is clamped to the ejector part of the frame and the injection side of the mold sub-assembly is clamped to the injection part of the frame.

As known from U.S. Pat. No. 6,802,704 (hereinafter "U.S. Pat. No. 6,802,704"), a clamping device is advantageously used to selectably clamp parts of the frame together and to clamp the injection part of the frame to a so-called "hot half" of a mold assembly. The clamp construction of U.S. Pat. No. 6,802,704 is directed to allowing use of a two-part frame as known in the art with mold assemblies comprising a sub-assembly for distributing material from an injection unit to cavities of a mold sub-assembly and comprising nozzles that project through the injection part of the frame and into the injection "side" of the mold sub-assembly. The clamp construction of U.S. Pat. No. 6,802,704 allows the two-parts of the frame to remain joined as the movable platen is moved away from the fixed platen a sufficient distance to provide clearance between the injection part of the frame and the projecting nozzles of the material distributing sub-assembly. Once clear of the projecting nozzles, a mold sub-assembly can be removed from the frame. As illustrated in U.S. Pat. No. 6,802,704 the two-part frame is retracted a distance that allows the injection part of the frame to remain supported by pins projecting from that part of the frame into the material distributing sub-assembly. The arrangement of support pins as illustrated imposes a limit on the distance "X" by which the injection part of the frame can be separated from the material distributing sub-assembly and maintain support by the illustrated support pins.

It is known that accurate alignment of nozzles of material distributing sub-assemblies with mold insert members in which the nozzles are received is required to achieve sealing between the nozzles and other components of a mold assembly to prevent leakage of material under normal operating conditions. However, while quick change frame constructions are effective to reduce time required for installation of mold assemblies in clamp units, the known constructions do not include means for achieving accurate alignment of nozzles with mold insert members. Hence, in view of limitations of known quick change constructions, there is a need for improved two-part frame constructions overcoming limitations on the extent of permitted separation between an injection part and a material distributing sub-assembly and deficiencies for effecting alignment of nozzles of material distributing sub-assemblies with mold insert members.

SUMMARY OF THE INVENTION

It is an object of the present invention to provide an apparatus facilitating removal and installation of mold insert members comprising components of mold assemblies from and into the clamp unit of an injection molding machine comprising a material distributing sub-assembly from which at least one material distributing nozzle projects, the apparatus comprising a two-part frame adapted to receive mold insert members comprising mold components of a mold assembly, the two part frame comprising an ejector part, an injection part being releasably connectable to the material distributing sub-assembly, and support pins spanning between the ejector part and the injection part when the injection part is separated from the material distributing sub-assembly and further comprising guide elements projecting from the material distributing sub-assembly for engaging a mold insert member received in the injection part, the guide elements effective for aligning the mold insert member relative to the material distributing sub-assembly.

It is a further object of the invention to provide a two part frame for facilitating removal and installation of mold insert members comprising components of a mold assembly from and into the clamp unit of an injection molding machine, the mold assembly being adapted for releasable connection with a material distributing sub-assembly having at least one projecting material distributing nozzle and being mounted and attached to a fixed platen of the clamp unit, the frame comprising an ejector part, an injection part, a plurality of support pins and corresponding support pin bores arranged to support the injection part from the ejector part when the injection part is separated from the material distributing sub-assembly, and a plurality of clearance bores through the injection part allowing elements projecting from the material distributing sub-assembly to protrude into mold insert members received in the injection part when the injection part is connected with the material distributing sub-assembly.

Further objects and advantages of the invention shall be made apparent from the accompanying drawings and the following description thereof.

In accordance with the aforesaid objects the present invention provides an apparatus for facilitating removal and installation of mold components of a mold assembly from and into a clamp unit of an injection molding machine, the apparatus comprising a two-part frame comprising an ejector part mounted and attached to a movable platen of the clamp unit, the ejector part configured to receive mold insert members of a primary core component of the mold assembly, and an injection part releasably connected to a material distributing sub-assembly of the mold assembly, the material distributing sub-assembly being mounted and attached to a fixed platen of the clamp unit, the injection part configured to receive mold insert members of a primary cavity component of the mold assembly, wherein the primary cavity component comprises a member for receiving the outlet ends of material distributing nozzles comprising the material distributing sub-assembly, a plurality of support pins projecting from one of the ejector part and injection part toward the other of the ejector part and injection part, the one of the ejector part and injection part not comprising the support pins comprising a plurality of support pin bores for receiving the support pins, the support pins and support pin bores lying outside the area circumscribed by sides of the mold insert members received in the two-part frame, the injection part being supported by the ejector part when the injection part is separated from the material distributing sub-assembly, a plurality of guide pins projecting from the material distributing sub-assembly toward the movable platen and a plurality of guide pin bores in a mold insert member of the primary cavity component for receiving the guide pins, the guide pins and guide pin bores cooperating to align an insert mold member of the primary cavity component with the material distributing sub-assembly. Further, the invention provides a two-part frame for facilitating removal and installation of mold insert members comprising components of a mold assembly from and into the clamp unit of an injection molding machine, the mold assembly being adapted for releasable connection with a material distributing sub-assembly having at least one projecting material distributing nozzle and being mounted and attached to a fixed platen of the clamp unit, the frame comprising: an ejector part for receiving mold insert members comprising a primary core component of a mold assembly; an injection part for receiving mold insert members comprising a primary cavity component of a mold assembly; a plurality of support pins and corresponding support pin bores arranged to support the injection part from the ejector part when the injection part is separated from the material distributing sub-assembly, the support pins and support pin bores being arranged to permit removal and installation of mold insert members from and into the two-part frame; at least one clamping device for releasably clamping the injection part to the material distributing sub-assembly; and, at least one first clearance bore through the injection part, and a plurality of second clearance bores through the injection part, the first clearance bores located to receive projecting material distributing nozzles of the material distributing sub-assembly and the second clearance bores located to receive projecting guide elements of the material distributing sub-assembly, the first clearance bores and the second clearance bores allowing projecting nozzles and projecting guide elements, respectively, to protrude into mold insert members received in the injection part when the injection part is connected with the material distributing sub-assembly.

DETAILED DESCRIPTION OF THE PREFERRED EMBODIMENT

The invention shall be illustrated with reference to a preferred embodiment which shall be described in detail. It is not the intention of applicants that the invention be limited to the preferred embodiment, but rather that the invention shall be defined by the appended claims and all equivalents thereof.

Figure 1:
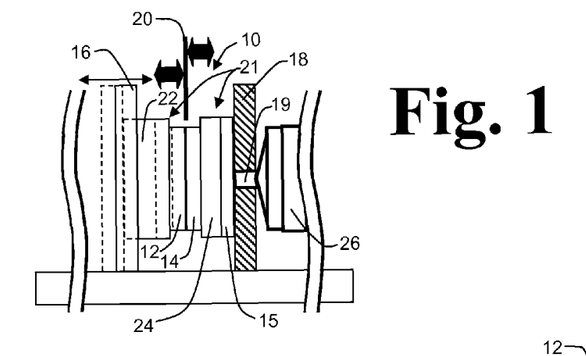
FIG. 1 is a partial cross sectional view of a clamp unit and an injection unit of an injection molding machine.

Referring to FIG. 1, a clamp unit of an injection molding machine is illustrated schematically and comprises a movable platen 16 and a stationary platen 18. A mold assembly 10 is located between movable platen 16 and stationary platen 18, one so called "side" of mold assembly 10 being supported from movable platen 16 and movable therewith and the other "side" of mold assembly 10 being supported from fixed platen 18. A mold parting line, such as mold parting line 20, demarks the plane to and from which primary core component 12 is advanced and retracted by movement of movable platen 16. Typically, opposed faces of members of primary core component 12 and primary cavity component 14 abut at the parting plane demarked by parting line 20. Article forming dies comprising primary core component 12 and primary cavity component 14 are fully engaged when those opposing faces abut. Ejector part 22 of a two-part frame 21 is mounted and attached to movable platen 16 and receives primary core component 12 of mold assembly 10. Primary core component 12 may advantageously comprise a sub-assembly of members providing support for a core mold die having article forming surfaces as well as a mechanism and components to dislodge molded articles from the core mold die. A material distributing sub-assembly 15 is associated with a primary cavity component 14 of mold assembly 10 and is mounted and attached to fixed platen 18. Material distributing sub-assembly 15 comprises a construction of conduits and nozzles in fluid communication (not shown in FIG. 1) for receiving melt from nozzle 19 and for conveying melt through nozzles to at least one cavity formed by engagement of primary core component 12 with primary cavity component 14 of mold assembly 10. Primary cavity component 14 is received in an injection part of two-part frame 21, such as injection part 24, which is releasably connected to material distributing sub-assembly 15. Primary cavity component 14 may advantageously comprise a sub-assembly of members providing support for a cavity mold die having article forming surfaces which, when juxtaposed with corresponding article forming surfaces of a core mold die, establish at least one cavity defining an article to be molded. Two-part frame 21 facilitates removal and installation of insert members of mold components 12 and 14 from and into the clamp unit. Molded articles are produced by performance of a cycle of operation of injection molding comprising: (i) filling the mold cavities with material in flowable condition, so-called "melt"; (ii) allowing the melt to solidify; and, (iii) with the mold components separated, i.e., "open", removing the molded articles. Movable platen 16 is moved to open and close mold assembly 10, an open position of movable platen 16 being shown in phantom (dashed line) in FIG. 1. Melt is injected to mold assembly 10 from a nozzle such as nozzle 19 of an injection unit 26, the nozzle passing through an opening of stationary platen 18 as illustrated by the cross-section thereof shown in FIG. 1.

Figure 2A:
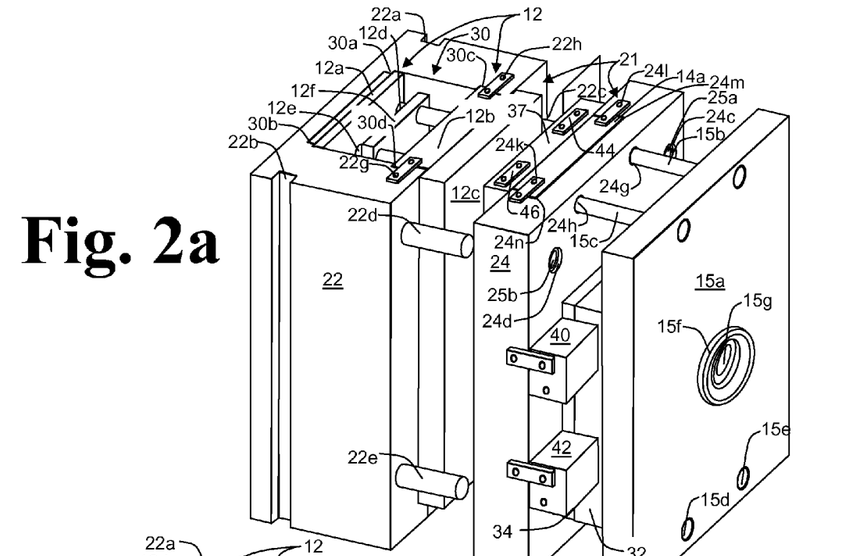
FIGS. 2a and 2b are three dimensional views of "open" and "closed" conditions of a two-part frame with mold members in accordance with the invention.
Figure 2B:
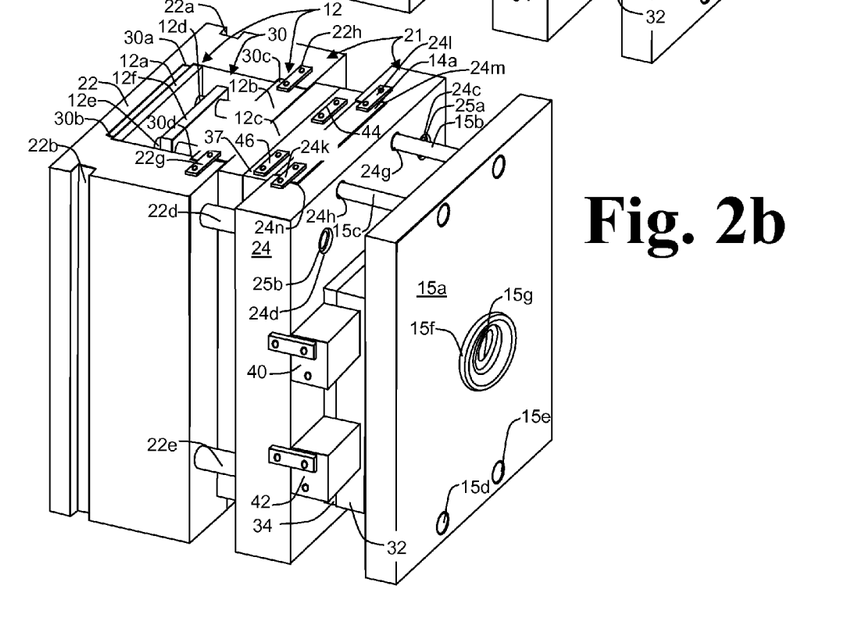

Referring to FIGS. 2a and 2b, a two-part frame with insert members of mold components 12 and 14 installed in accordance with the invention shall be described in detail. As noted with reference to FIG. 1, two-part frame 21 comprises ejector part 22 adapted to be mounted and attached to a movable platen of the clamp unit of an injection molding machine and injection part 24 to be connected with material distributing sub-assembly 15 so as to be releasable therefrom for purposes of removing and installing mold assembly insert members to two-part frame 21. Ejector part 22 is advantageously removably clamped to movable platen 16 by, for example, clamp members (not shown) engaging external vertical grooves 22a and 22b proximate the rear face of ejector part 22. Other means for mounting ejector part 22 to movable platen 16 may be used as appropriate to the load to be supported by ejector part 22 comprising both the ejector side mold insert members and, when mold inserts are to be removed and installed, injection part 24. In FIGS. 2a and 2b, back plate 15a is mounted and attached to the fixed platen of a clamp unit 10, such as fixed platen 18. Injection part 24 is releasably connected with material distributing sub-assembly 15 which is mounted and attached to a fixed platen of a clamp unit such as fixed platen 18 of the clamp unit of FIG. 1.

Continuing with reference to FIGS. 2a and 2b, material distributing sub-assembly 15 advantageously comprises a back plate such as back plate 15a for supporting members such as members 32 and 34 for mounting material distributing components such as a manifold and nozzle assemblies. As seen in FIGS. 2a and 2b, back plate 15a is advantageously fitted with locating ring 15f surrounding opening 15g into which an injection unit nozzle, such as nozzle 19 of FIG. 1, penetrates. Locating ring 15f facilitates mounting and attachment of back plate 15a to a fixed platen such as fixed platen 18. Material distributing sub-assembly 15 is mounted and attached to back plate 15a, receives material from an injection unit and conveys material from the injection unit to nozzles in fluid communication with cavities of mold assembly 10. FIG. 2a illustrates two-part frame 21 in an "open" condition, that is, a condition wherein the ejector part 22 is disengaged from the injection part 24. FIG. 2b illustrates two-part frame 21 in a "closed" condition, that is, a condition wherein the ejector part 22 is engaged with injection part 24 and the two-parts are separated by a distance at which a core mold die of primary core component 12 is fully engaged with a cavity mold die of primary cavity component 14, constituting a "closed" condition of mold assembly 10. In accordance with the invention, guide elements are fixed to and project from material distributing sub assembly 15 to engage primary cavity component 14 so as to effect alignment of mold insert members of primary cavity component 14 relative to material distributing sub-assembly 15. As illustrated in FIGS. 2a and 2b, guide elements, such as guide pins 15b, 15c, 15d, and 15e project from back plate 15a, pass through second clearance bores through injection part 24, such as clearance bores 24g, 24h, 24i and 24j, and engage primary cavity component 14. In FIGS. 2a and 2b guide pins 15b and 15c are shown projecting from material distributing sub-assembly 15 and into second clearance bores 24g and 24h, respectively, of injection part 24.

Continuing with reference to FIGS. 2a and 2b, ejector part 22 defines an opening such as opening 30 in which primary core component 12 is received, the opening advantageously including elements for engaging peripheral features of primary core component 12 so as to restrain primary core component 12 within the opening. For example, vertical corner steps 30a and 30b project inwardly from the back wall and side walls of opening 30 and opposing vertical grooves 30c and 30d are recessed into the side walls of opening 30 proximate the front face of ejector part 22. Steps 30a and 30b and grooves 30c and 30d engage cooperating peripheral features of the ejector half mold insert (primary core component 12 of mold assembly 10). As noted with reference to FIG. 1, primary core component 12 advantageously comprises a mechanism for dislodging molded articles from mold assembly 10. As seen in FIGS. 2a and 2b, primary core component comprises ejector back plate 12a, ejector front plate 12b, core plate 12c for supporting a core mold die, and ejector plate guide rods such as guide rods 12d and 12e on which an ejector plate such as ejector plate 12f is supported. Ejector pins or other known members (not shown) are fixed to ejector plate 12f and are adapted to contact a molded article at the article forming surfaces of a mold core die so that advance of those members towards the mold parting line is effective to dislodge a molded article from the mold core die. Ejector plate 12f is reciprocated within the space between ejector back plate 12a and ejector front plate 12b to advance and retract the ejector members. When ejector plate 12f is retracted relative to ejector front plate 12b, the portion of the ejector members at the article forming surfaces of the mold core die are made flush with the immediately surrounding article forming surfaces to minimize marking by the ejector members of surfaces of molded articles. As is known, ejector plate 12f may be moved relative to ejector back plate 12a and ejector front plate 12b either actively by an actuating device or passively by movement of the movable platen to which ejector part 22 is attached.

Figure 5:
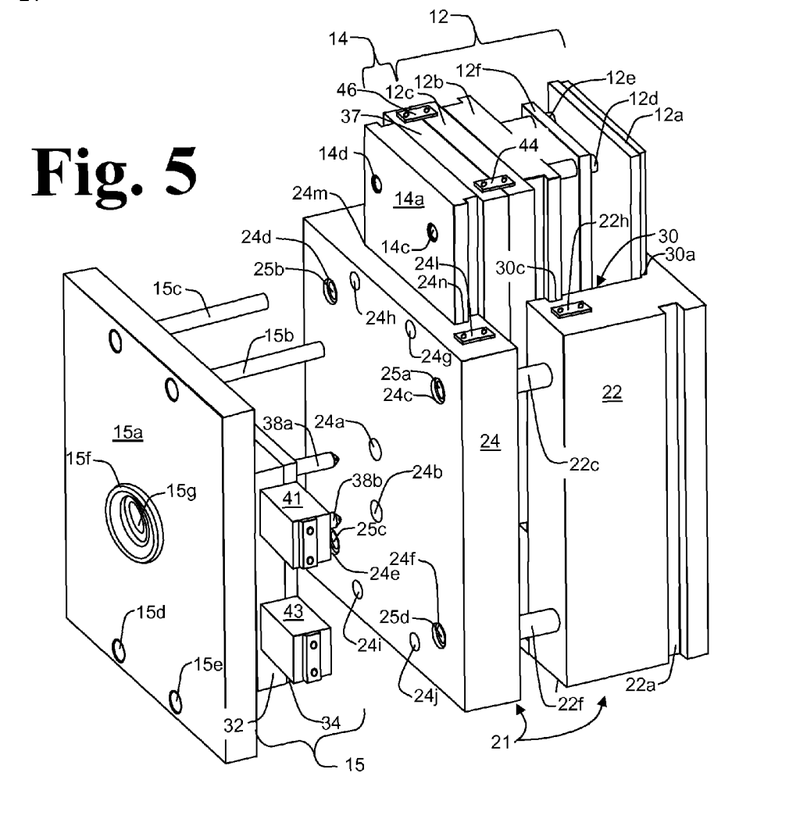
FIG. 5 is a three dimensional view of the two-part frame of FIGS. 2a and 2b with mold members partially inserted therein.

Continuing with reference to FIGS. 2a and 2b, support pins, such as support pins 22c, 22d, 22e and 22f (FIG. 5) facilitate support of injection part 24 and ejector part 22 one with the other when mold insert members are to be removed from or installed into two-part frame 21. As shown in FIGS. 2a and 2b, support pins 22c-22f project from ejector part 22 and engage injection part 24 at cooperating bores such as support pin bores 24c, 24d, 24e, and 24f (FIG. 5). Each cooperating bore is fitted with a support pin bushing, such as support pin bushings 25a, 25b, 25c (FIG. 5) and 25d (FIG. 5) to engage the projecting end of a supports pin. Advantageously, the support pin bushings are replaceable and are effective as wear inserts, i.e., the bushings wear with repetition of engagement and disengagement of ejector part 22 and injection part 24 and can be replaced as needed in consequence of wear with use. In addition, the support bushings, in cooperation with the support pins are effective to align ejector part 22 with injection part 24 to facilitate engagement and disengagement of cooperating mold members inserted into and supported by ejector part 22 and injection part 24. The support pins are located so as to span between parts of two-part frame 21 outside the area bounded by the peripheries of mold insert members received in ejector part 22 and injection part 24. Hence, the support pins do not pass through the mold insert members nor do the support pin bores intersect the mold insert members whereby the support pin bushings do not enter into any mold insert members.

In both FIGS. 2a and 2b, injection part 24 of two-part frame 21 is clamped to material distributing sub-assembly 15 to allow for repeated cycles of operation to fill mold cavities of, and release molded articles from mold assembly 10. That is, with injection part 24 connected with and clamped to material distributing sub-assembly 15, reciprocation of movable platen 16 is effective to "open" and "close" two-part frame 21 and mold assembly 10 whereby support pins 22c, 22d, 22e and 22*f* (FIG. 5) are separated from and engaged with support pin bores 24*c*, 24*d*, 24*e*, and 24*f* (FIG. 5). Releasable clamp devices such as clamps 40, 41 (FIG. 5), 42 and 43 (FIG. 5) simultaneously engage peripheries of injection part 24 and material distributing sub-assembly 15. Opposed vertical grooves of injection part 24, such as grooves 24*m* and 24*n*, receive corresponding projections of sides of support plate 14*a* of primary cavity component 14 so as to restrain movement of primary cavity component 14 relative to injection part 24. Mold member components are releasably clamped in place in parts of two-part frame 21 by mold member insert clamp devices located on the peripheries of the injection part and the ejector part, such as mold member insert clamp pair 22*g* and 22*h* on the periphery of ejector part 22 and mold member insert clamp pair 24*k* and 24*l* of injection part 24. As seen in FIGS. 2*a* and 2*b*, mold member insert clamp pair 22*g* and 22*h* simultaneously engage ejector part 22 and front plate 12*b* of primary core component 12 while mold member insert clamp pair 24*k* and 24*l* simultaneously engage injection part 24 and support plate 14*a* of primary cavity component 14. As shown in both FIGS. 2*a* and 2*b*, releasable clamp devices, such as mold assembly insert clamps 44 and 46, for connecting primary core component 12 with primary cavity component 14 are in a condition to release primary core component 12 from primary cavity component 14 to enable repeated cycles of operation of the clamp unit for injection molding.

Figure 3:
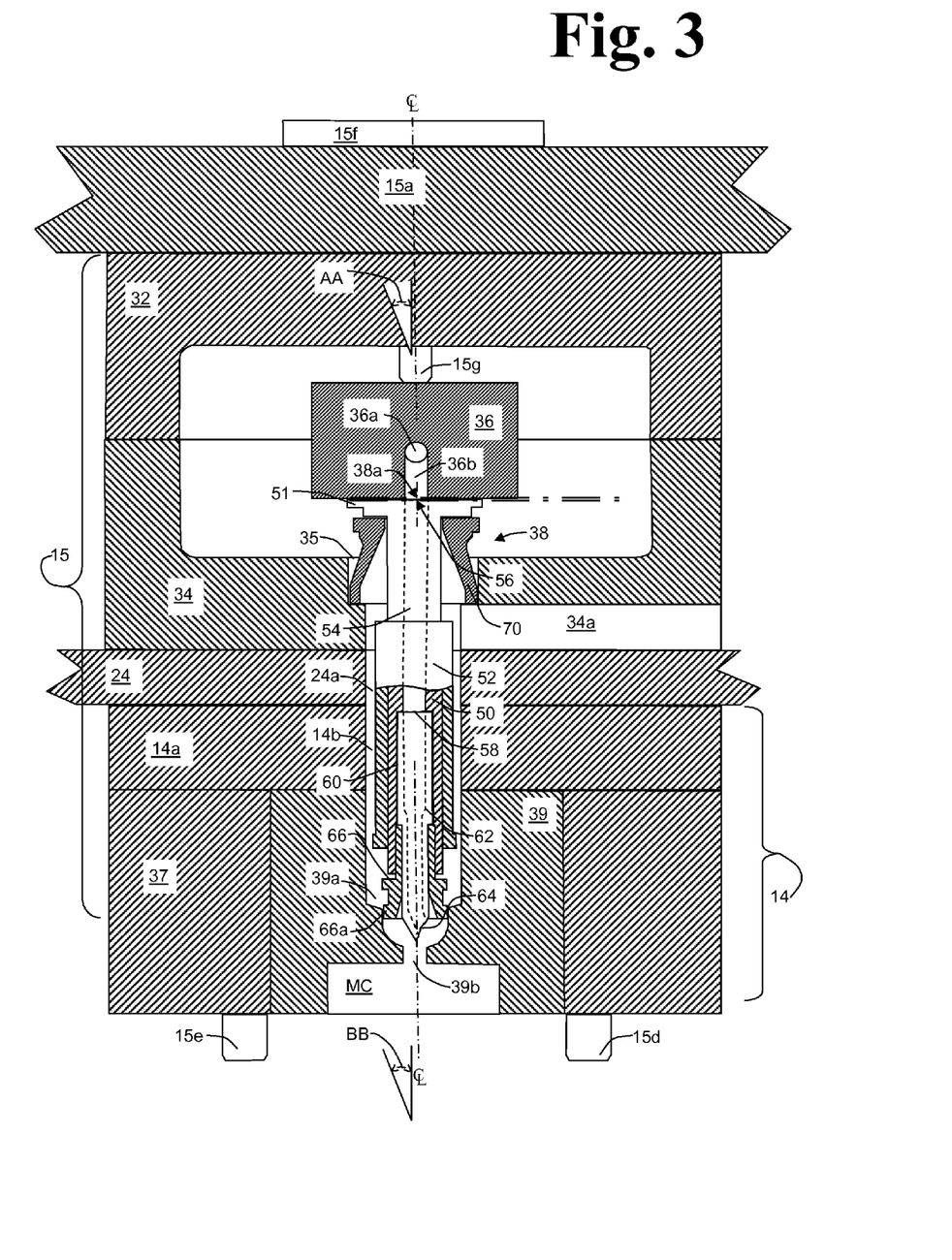
FIG. 3 is a partial cross section of members comprising a material distributing sub-assembly depicted schematically in the clamp unit of FIG. 1.

A portion of a material distributing sub-assembly such as material distributing sub-assembly 15 together with mold insert members of mold assembly 10 is shown in FIG. 3 in partial cross section. As noted with reference to FIGS. 2*a* and 2*b*, material distributing sub-assembly 15 is mounted and attached to a back plate such as back plate 15*a* (a portion thereof shown in FIG. 3) advantageously having a locating ring such as locating ring 15*f* affixed thereto. Back plate 15*a* is mounted and attached to a fixed platen of a clamp unit such as fixed platen 18. Conduits for conveying melt comprise a manifold in fluid communication with the nozzle of an injection unit such as nozzle 19 of FIG. 1 and one or more distributing nozzles. As shown in FIG. 3, material enters a manifold block such as manifold bock 36 via an inlet nozzle 15*g* and is conveyed through conduits of manifold block 36 to distributing nozzles such as nozzle assembly 38. Advantageously, heating elements (not shown) are fitted to manifold block 36 to supply heat required to maintain material within manifold block 36 in a flowable condition. Within material distributing sub-assembly 15 manifold block 36 is supported between manifold retainer plate 32 and nozzle retainer plate 34 so as to minimize contact between manifold block 36 and plates 32 and 34 whereby heat transfer from manifold block 36 is reduced. Nozzle assemblies associated with manifold block 36, such as nozzle assembly 38, are supported in nozzle retainer plate 32 to minimize contact of each nozzle assembly with nozzle retainer plate 32. Although plates 32 and 34 are shown as "U" shaped cross-sections in FIG. 3, it is known to provide alternative constructions where front and back plates are joined with side plates to define a space within which a manifold block is supported and from which nozzle assemblies project. Also shown in FIG. 3 are projecting ends of guide pins 15*d* and 15*e*. Although not required for the function served by the guide pins, it is contemplated that length of the guide pins may exceed that needed to suitably engage primary cavity component 14 and any excess length projecting beyond the face of cavity plate 37 thereof would be received in clearance bores (FIG. 4) of core plate 12*c* of primary core component 12.

Continuing with reference to FIG. 3, the outlet of each nozzle assembly is located at the end of the nozzle assembly projecting from material distributing sub-assembly 15 through first clearance bores through injection part 24, such as clearance bore 24*a*, and through clearance bore 14*b* through support plate 14*a*, into a receiving opening of the cavity mold die (a so-called "well"). In FIG. 3, the projecting end of nozzle assembly 38 is received in well 39*a* of mold die block 39. A heating element such as heater 52 comprising nozzle assembly 38 is effective to maintain melt within nozzle assembly 38 in a flowable condition. As seen in FIG. 3, a channel, such as channel 34*a* allows for connection of electrical power or heat transfer fluid conduits (not shown) from outside nozzle retainer plate 34 to heater 52. Nozzle assemblies such as nozzle assembly 38 are held in abutting contact with manifold block 36 by compressive forces created by fasteners (not shown) joining manifold retainer plate 32 with nozzle retainer plate 34, the compressive forces being transferred from manifold retainer plate 32 through supports interposed between manifold retainer plate 32 and manifold block 36 and through manifold block 36 to a collar such as collar 70 surrounding a portion of the head (inlet) end of nozzle assembly 38 and abutting a shoulder in bore 35 of nozzle retainer plate 34. Advantageously, collar 70 engages an inlet end flange of nozzle assembly 38 such as flange 51. While collar 70 is illustrated as a removable collar, a collar suitable for locating nozzle assembly within bore 35 and transferring compressive forces can comprise an integrated element of the head end of a nozzle body. By virtue of spacing between the interior step of bore 35 and the opposed face of manifold block 36, collar 70 is elastically compressed in consequence of clamping forces applied by fasteners joining manifold retainer plate 32 and nozzle retainer plate 34. Collar 70 exerts a compressive force on nozzle assembly 38 in the direction of manifold block 36 according to the extent of elastic compression of collar 70. That force is sufficient to maintain sealing contact between the inlet end face of nozzle assembly 38 and the abutting face of manifold block 36 under normal operating conditions. The longitudinal centerline of each stepped bore 35 is substantially aligned with the longitudinal centerline of a well 39*a* so that the longitudinal centerline of each nozzle assembly supported by nozzle retainer plate 32 is substantially aligned with the longitudinal centerline of a well 39*a*. Collar 70 locates nozzle body 50 within bore 35 so that nozzle body 50 is spaced from the internal sidewalls of bore 35, whereby there is no direct contact between nozzle body 50 and the interior of bore 35. Such spacing reduces heat transfer from nozzle assembly 38 to nozzle retainer plate 34 aiding maintenance of a flowable condition of material within nozzle assembly 38.

As noted herein, manifold block 36 receives melt from injection unit 26 and conveys melt through one or more internal manifold passages such as manifold passage 36*a* in fluid communication with distributing nozzle assemblies abutted to manifold block 36. In constructions where more than one nozzle assembly is associated with a single manifold passage 36*a*, communicating passages, such as communicating passage 36*b* convey melt from the manifold passage through a communicating passage outlet 38*a* to a nozzle assembly inlet. Nozzle assembly 38 advantageously comprises an elongated cylindrical body such as nozzle body 50 through which a melt passage such as nozzle passage 54 communicates with a nozzle inlet 56 and a nozzle outlet 58. To still further advantage, an exit tip such as needle tip 60 is fitted to the outlet end of nozzle body 50 and comprises a tip passage 62 in fluid communication with nozzle passage 54 and tip outlet 64. Advantageously, needle tip 60 is retained in the outlet end of nozzle body 50 by a tip retainer such as tip retaining nut 66 threadably engaged with nozzle body 50. Alternative tip arrangements are known, including tip members that are directly threadably connected to nozzle bodies. Melt flows from the nozzle assemblies such as nozzle assembly 38 through mold cavity opening 39b, a so called "gate", into cavity space MC. Sealing contact is maintained between the forward end of nozzle assembly 38 and sidewalls of well 39a to prevent material from escaping from well 39a. As illustrated in FIG. 3, that sealing contact is effected by contact of a protruding flange 66a of tip retaining nut 66 with sidewalls of well 39a. By virtue of reliance on abutting contact of inlet end face of nozzle assembly 38 with manifold block 36 and abutting contact of the forward end of nozzle assembly 38 with sidewalls of the well in which it is received, desired alignment of nozzle assembly 38 is effective to achieve sufficient abutting contact at the inlet and outlet ends of nozzle assembly 38 to prevent leakage of melt under normal operating conditions. Tilt or cocking from vertical either at the inlet end of nozzle assembly 38 as indicated by angle "AA" or from the outlet end of nozzle assembly 38 as indicated by angle "BB" can reduce abutting contact sought to be achieved by desired alignment.

FIG. 3 illustrates a material distributing sub-assembly 15 having nozzles that are not fixedly attached to a manifold block but are clamped in abutting contact with a manifold block by compressive forces exerted by fasteners (not shown) joining manifold plate 32 with nozzle retainer plate 34. Such constructions allow the manifold block to move relative to the nozzle assemblies with temperature induced dimensional changes of the manifold block. Such relative movement allows alignment of each nozzle assembly to be established by contact of the forward end of the nozzle assembly with the nozzle retainer plate and walls of the well in which the forward end of the nozzle is received. Alternative constructions are well known wherein nozzle assemblies are threadably attached to a manifold block either by threads of the nozzle assemblies engaging threads of the manifold block or by threaded retaining devices clamping each nozzle assembly to the manifold block. In such alternative constructions, temperature induced dimensional changes of the manifold block result in movement of, at least, the inlet ends of the attached nozzle assemblies. It will be understood by those skilled in the art that the selection of fixedly attached nozzle assemblies or slidably abutted nozzle assemblies is made in accordance with the expected temperature induced dimensional change of the manifold in normal operation and the extent of permissible change of alignment of the nozzle outlets relative to the nozzle inlets effected by displacement of the nozzle inlets with temperature induced dimensional changes of the manifold.

Figure 4:
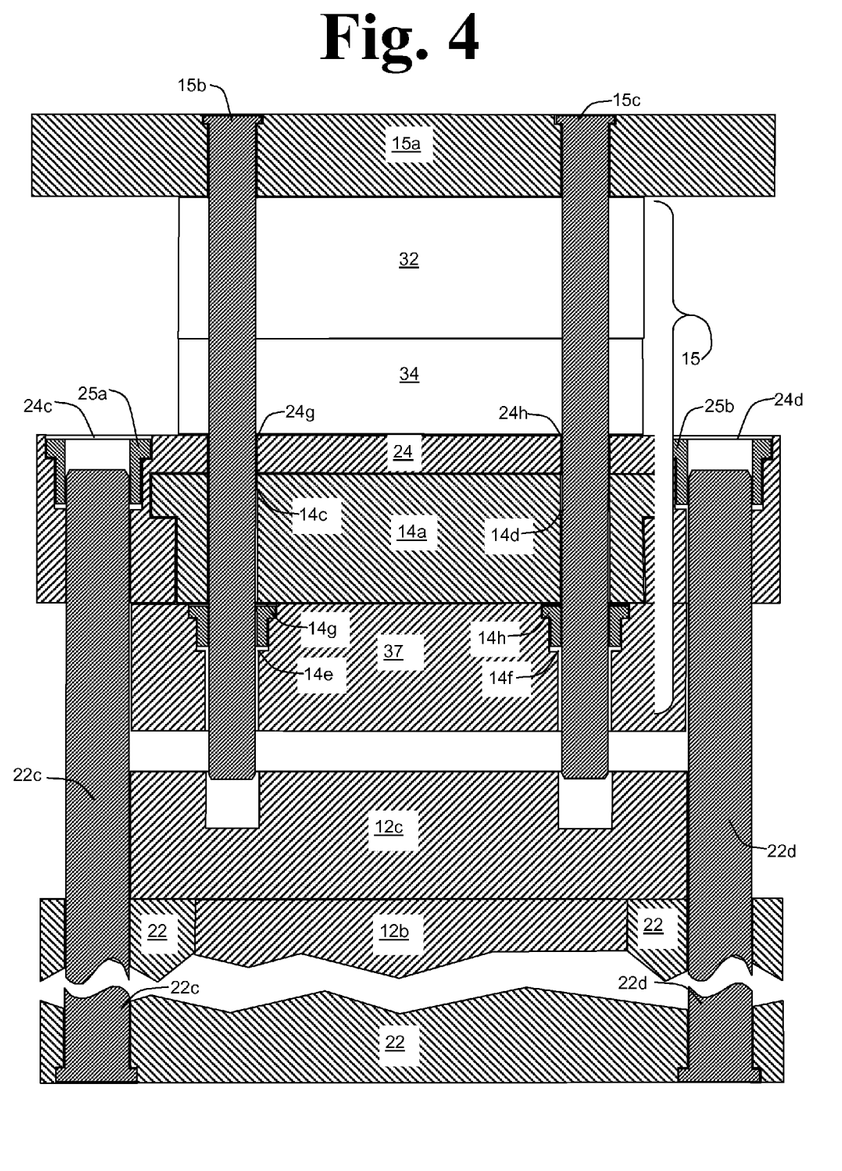
FIG. 4 is a partial cross section of a two-part frame with mold members in accordance with the invention.

Description of support pins and guide pins comprising the two-part frame in accordance with the invention shall be described with reference to the partial cross sectional view of FIG. 4. As shown in FIG. 4, support pins 22c and 22d are partially withdrawn from support pin bushings 25a and 25b, respectively. As noted herein, support pins such as support pins 22c-22f are fully advanced into and fully withdrawn from the associated support pin bushings, and injection part 24 with each complete execution of a cycle of operation for injection molding. That is, with complete closure of mold assembly 10, support pins are fully advanced into the associated support pin bushings and with full opening of mold assembly 10, support pins are fully retracted from injection part 24. Support pins such as support pins 22c and 22d are mounted in ejector part 22 and project therefrom towards injection part 24. As seen in FIG. 4, enlarged head ends of the support pins are seated in recesses in the rear face of ejector part 22 so that the support pins are restrained from being pulled through ejector part 22 and separated therefrom. When ejector part 22 is installed in a clamp unit, the rear face of ejector part 22 abuts the movable platen so that the support pins are restrained from separating from the rear face of ejector part 22 towards the movable platen. As shown in FIGS. 2a, 2b, and 4, the support pins are located outside the sides of mold insert members 37, 14a, 12c, and 12b to facilitate removal and insertion of mold insert members from and into two-part frame 21. While shown as being restrained at and projecting from ejector part 22, an equally acceptable arrangement of support pins and associated support pin bores would have the support pins restrained at and projecting from injection part 24 and the associated support pin bores and support pin bushings located in ejector part 22, so long as it is feasible to arrange the support pins, support pin bores and support pin bushings to lie outside the areas circumscribed by the peripheries of the mold insert members received in ejector part 22 and injection part 24.

Continuing with reference to FIG. 4, and as noted herein, throughout repeated execution of cycles of operation for injection molding, guide pins 15a-15d are fully advanced into injection part 24. As seen in FIG. 4, guide pins such as guide pins 15b and 15c are fully engaged with associated guide pin bushings, such as guide pin bushings 14g and 14h of primary cavity component 14 when injection part 24 is connected and clamped to material distributing sub-assembly 15. Guide pins, such as guide pins 15b and 15c pass through second clearance bores such as clearance bores 24g and 24h (FIG. 4) and clearance bores 24i and 24j (FIG. 5), of injection part 24, through clearance bores such as clearance bores 14c and 14d, of mold insert plate 14a, and through guide pin bushings such as guide pin bushings 14g and 14h (FIG. 4) of mold die plate 37. Guide pin bushings such as guide pin bushings 14g and 14h are seated at steps of guide pin bores of mold die plate 37 such as guide pin bores 14e and 14f. Guide pin bushings together with the associated guide pins are effective to align mold die plate 37 with material distributing sub-assembly 15. That is, engagement of the guide pins with the guide pin bushings of mold die plate 37 effects alignment of mold die plate 37 relative to material distributing sub-assembly 15 to achieve seating of the projecting ends of nozzles of material distributing sub-assembly 15 in wells of mold die plate 37. As noted with reference to FIG. 3, desired alignment of nozzle assemblies relative to receiving wells is effective to achieve sealing contact between the forward end of nozzle assemblies and sidewalls of the wells to prevent leakage of melt therebetween under normal operating conditions.

Description of the two-part frame in accordance with the invention when in condition for removal or installation of mold member inserts shall be made with reference to FIG. 5. In preparation for removal of insert members of mold assembly 10 from two-part frame 21, mold assembly 10 is closed, material distributing sub-assembly 15 is released from injection part 24, primary core component 12 and primary cavity component 14 are clamped together and movable platen 16 is retracted to fully separate material distributing sub-assembly 15 from injection part 24 allowing removal of primary core component 12 and primary cavity component 14 from two-part frame 21. In FIG. 5, two-part frame 21 and mold assembly inserts received in two-part frame 21 are "closed" and injection part 24 is disconnected and sufficiently separated from material distributing sub-assembly 15 so that projecting nozzles thereof are clear of engagement with primary cavity component 14. In addition, primary core component 12 and primary cavity component 14 are clamped together by clamping devices affixed to the periphery thereof such as mold assembly insert clamps 44 and 46. Further, all mold member insert clamp devices, such as mold member insert clamps 22h and 24l shown in FIG. 5 as well as mold member insert clamp devices 22g and 24k shown in FIGS. 2a and 2b, are disengaged from the associated members of the mold assembly components. In FIG. 5, primary core component 12 and primary cavity component 14 are shown partially received within two-part frame 21 as would obtain during removal from and insertion into two-part frame 21. In FIG. 5, support pins 22c and 22f are shown engaging both ejector part 22 and injection part 24 of two-part frame 21. Clamps for connecting material distributing sub-assembly 15 with injection part 24, such as clamps 41 and 43 of FIG. 5 and clamps 40 and 42 of FIGS. 2a and 2b are disconnected from injection part 24 allowing injection part 24 to be separated from material distributing sub-assembly 15. In FIG. 5, releasable clamping devices such as mold assembly insert clamps 44 and 46 are shown engaging both primary cavity component 14 (cavity plate 37 thereof) and primary core component 12 (core plate 12c thereof) to facilitate removal and insertion of mold insert members of those components as a unit into two-part frame 21. With injection part 24 sufficiently separated from material distributing sub-assembly 15 to allow removal and installation of mold insert members from and into two-part frame 21, forward ends of nozzles projecting from material distributing sub-assembly 15, such as nozzle forward ends 38a and 38b are fully withdrawn from injection part 24 and separated from first clearance bores 24a and 24b in injection part 24. Separation of material distributing sub-assembly 15 from injection part 24 is effected with release of clamps 40, 41, 42 and 43 so that injection part 24 is free to move independently of material distributing sub-assembly 15 (see the released condition depicted for clamps 41 and 43 of FIG. 5), support of injection part 24 by support pins of ejector part 22, and movement of the movable platen (to which ejector part 22 is attached) away from the fixed platen (to which material distributing sub-assembly 15 is attached). Although not shown in FIG. 5, it is common practice to fit lifting devices to primary core component 12 and primary cavity component 14 to allow the mold insert members thereof, when clamped together as described, to be removed from or inserted into two-part frame 21 vertically as suggested by the showing of FIG. 5. It will be understood by those skilled in the art that the number and location of such lifting devices is selected to allow for vertical movement without excessive rotation that would hamper movement of the mold insert members relative to the two-part frame.

What is claimed is:

1. An apparatus for facilitating removal and installation of mold components of a mold assembly from and into a clamp unit of an injection molding machine, the apparatus comprising a two-part frame comprising an ejector part mounted and attached to a movable platen of the clamp unit, the ejector part configured to receive mold insert members of a primary core component of the mold assembly, and an injection part releasably connected to a material distributing sub-assembly of the mold assembly, the material distributing sub-assembly being mounted and attached to a fixed platen of the clamp unit, the injection part configured to receive mold insert members of a primary cavity component of the mold assembly, wherein the primary cavity component comprises a member for receiving the outlet ends of material distributing nozzles comprising the material distributing sub-assembly, a plurality of support pins projecting from one of the ejector part and injection part toward the other of the ejector part and injection part, the one of the ejector part and injection part not comprising the support pins comprising a plurality of support pin bores for receiving the support pins, the support pins and support pin bores lying outside the area circumscribed by sides of the mold insert members received in the two-part frame, the injection part being supported by the ejector part when the injection part is separated from the material distributing sub-assembly, a plurality of guide elements projecting from the material distributing sub-assembly toward the movable platen for engaging a mold insert member received in the injection part and effective to align that mold insert member relative to the material distributing sub-assembly.

2. The apparatus according to claim 1 further comprising a plurality of replaceable support pin bushings, a replaceable support pin bushing located in each support pin bore for engaging a support pin, the replaceable support pin bushings effective as a wear insert for extending the useful life of the support pin bores with repeated engagement and disengagement of the support pins and the support pin bores.

3. The apparatus according to claim 2 wherein the support pin bushings and support pins cooperate to effect desired alignment of the ejector part and the injection part, facilitating desired alignment of the primary core component and primary cavity components throughout separation and engagement of the primary core and cavity components during execution of cycles of operation of the clamp unit for injection molding.

4. The apparatus according to claim 1 further wherein the guide elements comprise a plurality of guide pins and the apparatus further comprises a plurality of guide pin bores in a mold insert member in which the guide pins are to be received and a plurality of guide pin bushings, a guide pin bushing located in each guide pin bore for engaging a guide pin, the guide pin bushings and guide pins cooperating to effect alignment of the mold insert member of the primary cavity component with the material distributing sub-assembly whereby the projecting end of each nozzle of the material distributing sub-assembly is aligned with and desirably seated in a well of the primary cavity component when the injection part is connected with the material distributing sub-assembly.

5. The apparatus according to claim 1 further comprising at least one clamp device located on the periphery of the material distributing sub-assembly for releasably connecting the material distributing sub-assembly with the injection part.

6. The apparatus according to claim 1 further comprising at least one mold assembly insert clamp for releasably clamping an insert member of the primary core component with an insert member of the primary cavity component to allow the clamped insert members of the primary core and primary cavity components to be removed from and installed into the two-part frame as a unit, the mold assembly insert clamps being released to allow normal operation of the clamp unit.

7. The apparatus according to claim 1 wherein the primary core component comprises at least one mechanism for dislodging molded articles from the primary core component.

8. The apparatus according to claim 1 wherein each of the ejector part and injection part further comprise at least one mold member insert clamp device, each clamp device releasably engaging a part of the two-part frame and a mold member component installed in that part, the mold member insert clamp devices being released from the mold member components to facilitate removal of the mold member components from the two-part frame.

9. A two-part frame for facilitating removal and installation of mold insert members comprising components of a mold assembly from and into the clamp unit of an injection molding machine, the mold assembly being adapted for releasable connection with a material distributing sub-assembly having at least one projecting material distributing nozzle and being mounted and attached to a fixed platen of the clamp unit, the frame comprising:

a. an ejector part for receiving mold insert members comprising a primary core component of a mold assembly;

b. an injection part for receiving mold insert members comprising a primary cavity component of a mold assembly;

c. a plurality of support pins and corresponding support pin bores arranged to support the injection part from the ejector part when the injection part is separated from the material distributing sub-assembly, the support pins and support pin bores being arranged to permit removal and installation of mold insert members from and into the two-part frame;

d. at least one clamping device for releasably clamping the injection part to the material distributing sub-assembly;

e. at least one first clearance bore through the injection part and a plurality of second clearance bores through the injection part, the first clearance bores located to receive projecting material distributing nozzles of the material distributing sub-assembly and the second clearance bores located to receive projecting guide elements of the material distributing sub-assembly, the first clearance bores and the second clearance bores allowing projecting nozzles and projecting guide elements, respectively, to protrude into mold insert members received in the injection part when the injection part is connected with the material distributing sub-assembly.

10. The two-part frame according to claim 9 further comprising a plurality of replaceable support pin bushings, a support pin bushing received in each support pin bore, the support pin bushings effective as wear inserts for extending the useful life of the support pin bores with repeated engagement and disengagement of the support pins and support pin bores in connection with performance of cycles of operation of injection molding.

11. The two-part frame according to claim 9 wherein the support pins are located to span from the ejector part to the injection part of the two-part frame so as to lie outside an area bounded by the sides the mold assembly insert members received in the two-part frame.

12. The two-part frame according to claim 9 wherein the material distributing sub-assembly comprises at least one material distributing nozzle and a plurality of guide pins projecting therefrom, the distributing nozzles to be received in associated wells of a mold insert member received in the injection part and the guide pins to be engaged with guide pin bores of an insert member of the primary cavity component, and the clearance bores of the injection part include clearance bores for the projecting nozzles and guide pins and permit engagement of the guide pins and guide pin bores so as to be effective to align the insert member of the primary cavity component receiving the projecting nozzles with the material distributing sub-assembly when the injection part is connected with the material distributing sub-assembly.

13. The two-part frame according to claim 12 wherein the insert members of the primary cavity component further comprise a plurality of guide pin bushings, a guide pin bushing being located in each guide pin bore and wherein the clearance bores of the injection part permit engagement of the guide pins and guide pin bushings to effect the desired alignment of the mold insert member receiving the projecting nozzles with the material distributing sub-assembly.

14. The two-part frame according to claim 9 further comprising at least one mold assembly insert clamp for releasably clamping an insert member of the primary core component with an insert member of the primary cavity component to allow the clamped insert members of the primary core and primary cavity components to be removed from and installed into the two-part frame as a unit, the mold assembly insert clamps being released to allow normal operation of the clamp unit.

15. The two-part frame according to claim 9 wherein the primary core component comprises at least one mechanism for dislodging molded articles from the primary core component.

16. The two-part frame according to claim 9 wherein each of the ejector part and injection part further comprise at least one mold member insert clamp device, each clamp device releasably engaging a part of the two-part frame and a mold member component installed in that part, the mold member insert clamp devices being released from the mold member components to facilitate removal of the mold member components from the two-part frame.

17. The two-part frame according to claim 9 wherein the ejector part defines an opening for receiving the insert members of the primary core component and the opening further comprises surface features for engaging corresponding surface features on the periphery of one or more of the insert members of the primary core component so that with surface features of the opening and of the insert members of the primary core component engaged, the insert members of the primary core component are restrained from movement relative to the ejector part.

18. The two-part frame according to claim 17 wherein surface features of the opening comprise vertical grooves on facing sides of the opening for receiving corresponding vertical projections of a mold insert member of the primary core component.

19. The two-part frame according to claim 9 wherein the injection part further comprises at least one surface feature to be engaged by a corresponding surface feature of a mold insert member of the primary cavity component so as to restrain movement of the mold insert members of the primary cavity component relative to the injection part.

20. The two-part frame according to claim 19 wherein the surface features of the injection part comprise vertical grooves at the vertical sides of the injection part in which a mold member insert of the primary cavity component is received, the vertical grooves for engaging corresponding vertical projections of a mold member insert of the primary cavity component.

* * * * *